US012611899B2

(12) United States Patent
Witte et al.

(10) Patent No.: US 12,611,899 B2
(45) Date of Patent: Apr. 28, 2026

(54) STEERING SYSTEMS

(71) Applicant: PREMIER COIL SOLUTIONS, INC., Waller, TX (US)

(72) Inventors: M. Brett Witte, Waller, TX (US); Randall Behrens, Sealy, TX (US)

(73) Assignee: PREMIER COIL SOLUTIONS, INC., Waller, TX (US)

( * ) Notice: Subject to any disclaimer, the term of this patent is extended or adjusted under 35 U.S.C. 154(b) by 767 days.

(21) Appl. No.: 17/881,429

(22) Filed: Aug. 4, 2022

(65) Prior Publication Data
US 2023/0065406 A1      Mar. 2, 2023

Related U.S. Application Data

(63) Continuation-in-part of application No. 16/292,904, filed on Mar. 5, 2019, now Pat. No. 11,654,981.

(60) Provisional application No. 63/229,395, filed on Aug. 4, 2021, provisional application No. 62/638,380, filed on Mar. 5, 2018.

(51) Int. Cl.
| | |
|---|---|
| *B60D 1/24* | (2006.01) |
| *B60G 17/015* | (2006.01) |
| *B60G 17/016* | (2006.01) |
| *B62D 63/06* | (2006.01) |

(52) U.S. Cl.
CPC ......... *B60D 1/247* (2013.01); *B60G 17/0155* (2013.01); *B60G 17/0162* (2013.01); *B62D 63/068* (2013.01); *B60G 2300/044* (2013.01); *B60G 2500/326* (2013.01)

(58) Field of Classification Search
CPC  B60D 1/247; B60G 17/0155; B60G 17/0162; B60G 2300/044; B60G 2500/326; B60G 2202/413; B60G 17/0525; B60G 2300/0262; B60G 2300/04; B60G 2400/61; B60G 2500/30; B60G 2600/20; B62D 63/068
See application file for complete search history.

(56) References Cited

U.S. PATENT DOCUMENTS

| | | | |
|---|---|---|---|
| 1,126,309 | A | 1/1915 | Snyder |
| 3,685,853 | A | 8/1972 | Goldsmith |
| 4,111,273 | A | 9/1978 | Blackburn |
| 4,226,437 | A | 10/1980 | Trudeau |
| 4,423,884 | A | 1/1984 | Gevers |
| 4,705,288 | A | 11/1987 | Schmidt |
| 4,762,192 | A | 8/1988 | Maxwell |
| 5,328,197 | A | 7/1994 | Karilainen |
| 5,348,331 | A | 9/1994 | Hawkins |
| 5,363,924 | A | 11/1994 | Foley |

(Continued)

*Primary Examiner* — Jason D Shanske
*Assistant Examiner* — Al-Birr Rahman Chowdhury
(74) *Attorney, Agent, or Firm* — HUNTON ANDREWS KURTH LLP

(57) ABSTRACT

The present application pertains to a system comprising a multi-axle trailer with a front and a rear. The a multi-axle trailer comprises at least one lift axle configured to be raised or lowered to distribute weight, to increase trailer deflection during a turn, or both. A jeep is mounted between the trailer and a tractor wherein the jeep is configured to decrease weight on one or more axles. A booster is mounted to the rear of the multi-axle trailer. The system is configured such that during raising of the at least one lift axle an increase in air pressure to one or more other axles is increased to offset weight.

10 Claims, 2 Drawing Sheets

BARREL OR PISTON SIDE OF HYDRAULIC CYLINDER

ROD SIDE OF HYDRAULIC CYLINDER

STEERING CONNECTION PIN
STEERING HYDRAULIC CYLINDERS

FORCE APPLIED TO TRAILER

PINNED ATTACHMENT TO TRAILER

PIVOTING HORIZONTAL HINGE

FORCE APPLIED TO GROUND
(COMBINATION OF GRAVITY AND ADDITIONAL FORCE FROM HYDRAULIC CYLINDERS)

(56)          References Cited

U.S. PATENT DOCUMENTS

| | | | |
|---|---|---|---|
| 5,370,414 | A | 12/1994 | Tucker |
| 5,626,356 | A | 5/1997 | Harwood |
| 6,290,248 | B1 | 9/2001 | Yrigoyen |
| 7,806,423 | B2 * | 10/2010 | Vikstrom ........... B62D 53/0814 |
| | | | 280/441 |
| 8,215,657 | B1 | 7/2012 | Gist |
| 9,126,644 | B2 | 9/2015 | Banwart |
| 11,241,923 | B2 | 2/2022 | Johnston et al. |
| 11,332,207 | B2 | 5/2022 | Strelie et al. |
| 2010/0038868 | A1 | 2/2010 | Zork et al. |
| 2011/0266774 | A1 | 11/2011 | Gregg |
| 2021/0206223 | A1 * | 7/2021 | Strelic ................ B60G 17/0525 |
| 2021/0300489 | A1 * | 9/2021 | Strelic ................... B62D 13/00 |
| 2022/0097781 | A1 | 3/2022 | Poole et al. |

* cited by examiner

ROD SIDE OF HYDRAULIC CYLINDER

STEERING CONNECTION PIN

STEERING HYDRAULIC CYLINDERS

BARREL OR PISTON SIDE
OF HYDRAULIC CYLINDER

PIVOTING
HORIZONTAL
HINGE

FORCE APPLIED TO GROUND
(COMBINATION OF GRAVITY AND ADDITIONAL
FORCE FROM HYDRAULIC CYLINDERS)

FORCE APPLIED
TO TRAILER

PINNED ATTACHMENT
TO TRAILER

STEERING SYSTEMS

CROSS-REFERENCE TO RELATED APPLICATIONS

This application is a continuation-in-part of Ser. No. 16/292,904 filed Mar. 5, 2019 which application claims priority to provisional application 62/638,380 filed Mar. 5, 2018. The application also claims priority to U.S. Provisional Application No. 63/229,395 filed Aug. 4, 2021 which application is incorporated herein by reference. The application is also related to coil tubing patents which are U.S. Pat. Nos. 9,587,450; 9,828,026; 9,988,864 and U.S. Publication No. 20190270488, all of which are incorporated by reference herein.

FIELD

The present patent application relates to the application of delivery methods of coiled tubing equipment through the use of a trailer to transport permanently mounted or removable coil tubing equipment.

BACKGROUND AND SUMMARY

Premier Coil Solutions (PCS), 18993 GH Circle, Waller, Texas, USA, is an advanced manufacturer of Coiled Tubing Products. Premier Coil Solutions, herein known as PCS, is a worldwide leader in Engineering and Manufacturing Excellence in the Coiled Tubing Industry.

Coiled Tubing is a relatively new technology for the oil and gas industry. It is used for interventions in oil and gas wells and production tubing. Previous to the introduction of Coil Tubing, Wirelining was used to complete similar operations. The most common application is deliquification, and the dispersement of fluids to a specific location in the well. Coiled Tubing equipment is commonly divided into categories on how it is transported to and from jobsites. Division of equipment can be based on Truck Mounted, Trailer Mounted or Skid Mounted equipment. Skid and trailer mounted equipment can be permanently affixed, or mounted in such a manner where it is removable from a trailer with little effort. Coiled Tubing equipment that is easily transported and serviceable offers owners the best return on their investment. Ideally, transporting coil tubing equipment efficiently decreases well service costs and reduces man-hours and jobsite injuries. Due to the depths of wells, the tubing footage needed to complete most well servicing jobs has increased, which in turn, the methods of transportation have been strained. Trailer lengths have been extended to offer more axles to allow more equipment or tubing to be transported to and from jobsites. By its' inherent nature, the equipment needed for operations is heavy and requires specially modified trailers designed to transport loads of extreme weight, height, length, and width. In some circumstances, highway and roadway weight restrictions require the use of additional axles or the use of equipment with several axles that mounts to either the front or rear of the trailer to ease the weight per axle ratio, therefore limiting the turning capability of trailers. What is needed are improved steering and suspension systems.

Advantageously, the present application pertains to an improved steering and suspension systems for coiling tubing and other equipment.

DETAILED DESCRIPTION

Figure 1:
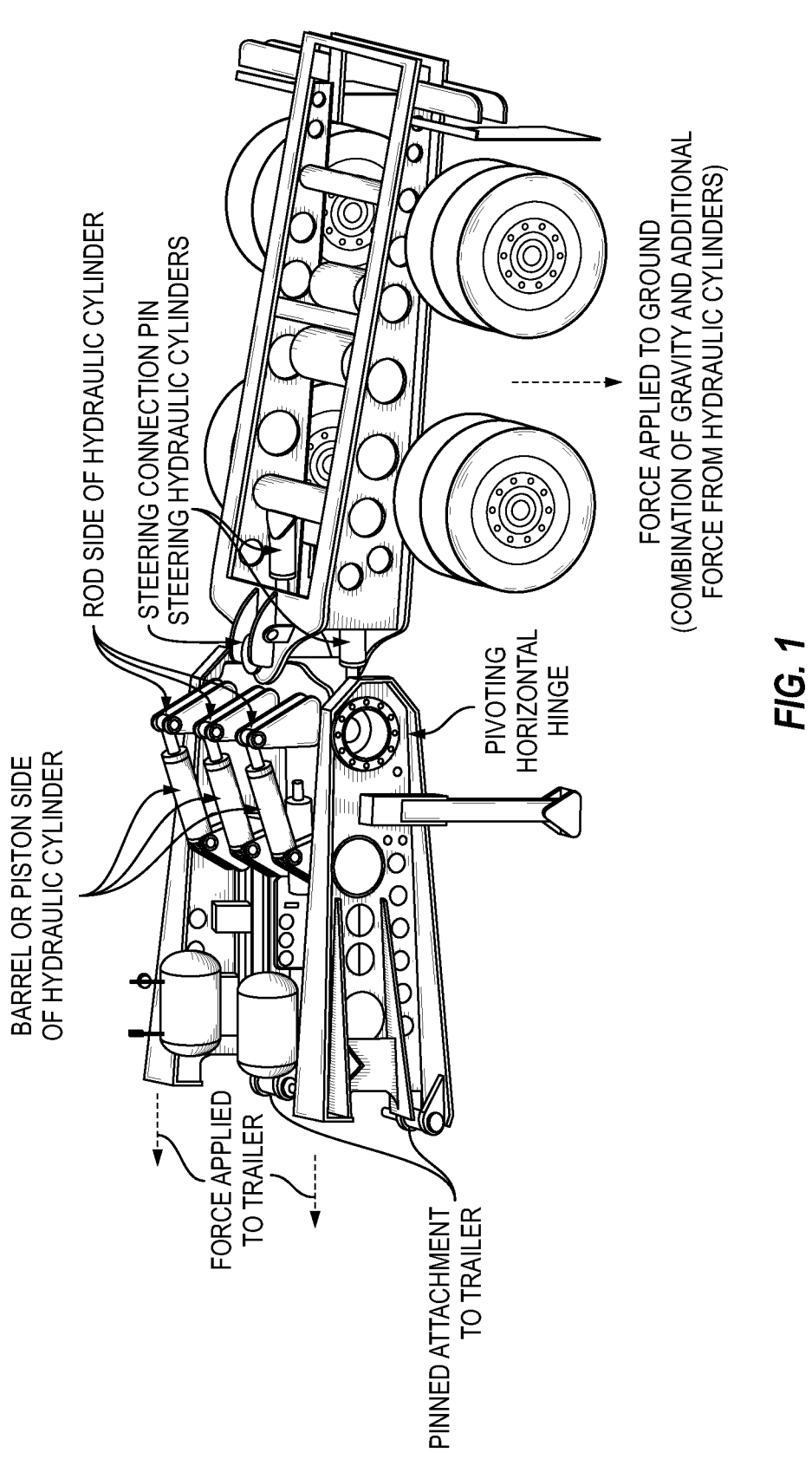
FIG. 1 shows hydraulic cylinders configured to create a pivoting motion on a rear booster section while a front section reacts against a trailer to transfer load from the rear trailer axles to the booster axles.
Figure 2:
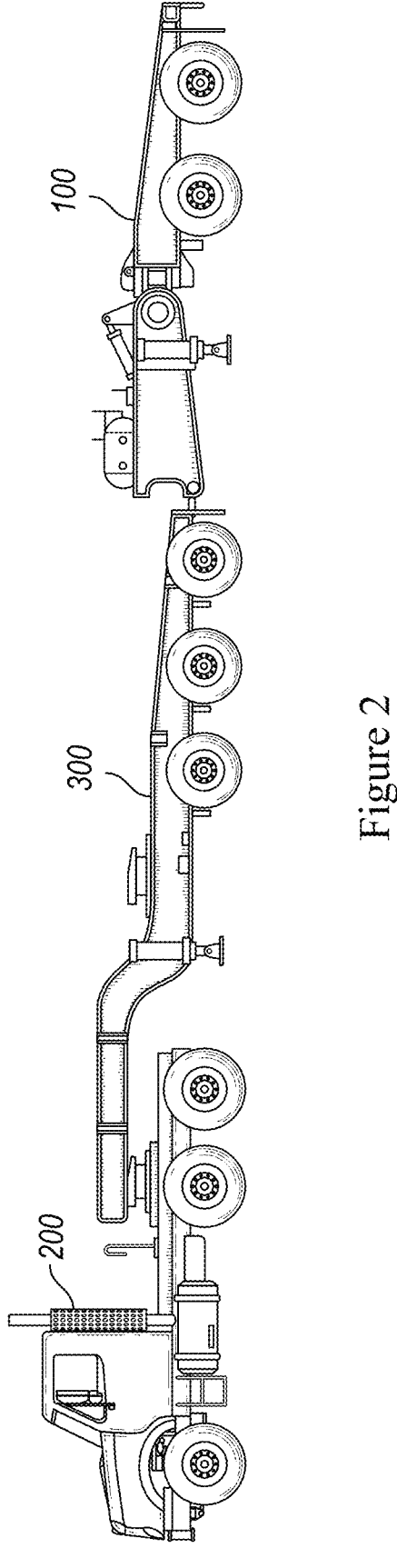
FIG. 2 shows the booster or auxiliary dolly of FIG. 1 attached to a trailer.

This addresses the axle steering, and suspension system which allows for the increased maneuverability of a coil tubing unit involving the use of an integrated system to detect transportation conditions and adapt to scenarios in which the system can be preset by the transporter or driver to adapt to roadway conditions and loading scenarios, and to allow for expedited movements based on common scenarios in which field conditions require changes to the way a unit is transported due to restrictions based upon height, weight, steering radius, and other factors which present itself during transportation.

These pieces of equipment that are affixed to a trailer to decrease axle weight are a "jeep" which is mounted in-between the trailer and the tractor. The other piece is commonly known as a "Booster" is mounted to the rear of the trailer. To increase the turning capability of trailers, manufacturers started employing an axle or axles that will turn in the direction of the tractor and therefore allow the Tractor and Coiled Tubing Unit to turn at a decreased radius. Some axles are also able to be raised upon command to assist in distribution of weight or to increase trailer deflection during turning movements.

The potential commercial value is limitless; as it pertains to significant design and safety advantages over our competition.

The Multi-Axle Load Balancing portion is designed to meet stringent over axle weight limitations on trailers that are designed in any multi-axle configuration. The layout contains a valve or valves or controllers that are operated by an electrical or hand operated switch or lever. It's also similar in that the controls the routing of air pressure from the air tanks and directs it towards the suspension and lift system for the lift axle. Where the system varies from normal design is during the lifting of any applicable axle, air pressure is increased to in one or more axles to offset weight. This is achieved by a proprietary designed control box and valves that are pneumatically powered, but also could be powered by hydraulic and electric or a combination thereof.

This system operates in a total of modes/configurations to meet requirements and or to assist in turning while under forward and or reverse movement. The embodiments described herein can be suited to fit any multi-axle trailer with hydraulic, air, or electric connections to the tractor, or pulling device, that may need to conform to highway laws by distributing axle weight, and steering maneuvers. These modes can be assisted by the additions of changes in movements to jeeps and boosters.

This application is directed towards the industry wide issues with safely and efficiently controlling the movement of a coil tubing unit within several scenarios in which the industry see the most difficulty in transportation and assists in these to avoid equipment damage and decrease time between operations. Through the use of a basic cause and effect scenario the expected output of the system is controlled via the operator's actions. These scenarios are relevant on both highway and off-highway transportation based upon speed, weight, and axle steering. There is a limiting device which is also employed as a default safety measure to prevent unwanted scenario output based upon speed, weight, and axle steering or other input factors.

Scenario #1—Highway Operation in Excess of a Preset Speed:

The operator can select the unit for highway operation which will allow for the trailer behind the tractor; either additionally equipped with or without a jeep and booster and a trailer or a combination of a jeep, trailer, no booster, or a trailer and booster with no jeep, to operate safely during roadway transportation. This scenario will allow the trailer to utilize a free float or drag steer for the turning axels of the trailer. This methodology resembles that of a normal shopping cart, whereas a combination of straight wheels and steering wheels are used after the direction is determined by the tractor steering.

Scenario #2—Highway/Off Road Operation Under of a Preset Speed:

The operator can select the unit for operation under a preset speed which will allow the unit to perform turning operations to prevent any restrictive equipment from interaction or damage due to small changes in direction that are common with low speed maneuvers with heavy haul scenarios. These small movements are present when trying to park or spot equipment in a close proximity or to maneuver around obstacles. Damage to the axles, trailer, jeep, and/or booster is most prevalent during these movements; due to the forces exhibited by essentially forcing movement to components that may not be designed or engineered to withstand intense forces. In this type of scenario, the booster is lifted from contact to the ground by hydraulic, electric, pneumatic, or other mechanical force. Next, a trailer axle is lifted from the ground, this can be any of the axles chosen by design. The remaining axles steer due to force. The turning force is regulated by either sensors on the $5^{th}$ wheel of the trailer or regulated by other means.

Automatic choosing of scenarios 1 or 2 can be completed via choices made by the operator or declared by speed or other means in which a sensing unit predicts the scenario based on factors such as environment, speed, resistance, weight etc.

Scenarios 1 and 2 also contain a manual function in the event of failure of the system. These allow preset axles to turn and preset axles to follow. These actions for scenarios 1 and 2 may also be completed in reverse gears in any combination of steer and follow axles.

Scenario 3 is a Reverse only scenario in which engages all trailer axles straight and applies forces to keep them straight during all reverse movements, and lifts the axles of the booster to prevent any unexpected movement. This also employs the ability of the operator/driver to control the steering of the axles on the trailer towards any direction desired with actuation of buttons or valves to manually control the extent of the direction of the turn as well as independent axle groups or single axles at will.

All 3 scenarios benefit from certain forward and reverse movements. Failsafe scenarios are included to prevent any damage to the equipment. They are programmed to intervene as needed in any scenario or during transitions between scenarios. Additional trailer mounted equipment can be programmed to operate in when activated by a particular scenario. These additional equipment movements can be shifting of the reel along the axis of the trailer, and raising or lowering of the reel during low speed low clearance events. Other movements may include the automatic positioning of all axles manually or automatically depending on the direction of the turn.

As shown in FIG. 1 hydraulic cylinders may be configured to create a pivoting motion on a rear booster section while a front section reacts against a trailer to transfer load from rear trailer axles to booster axles. One or more cylinders are configured to adjust the first and second portions relative to each other and apportion weight between the primary trailer and the auxiliary dolly wherein the one or more cylinders comprise loading cylinders configured to apply and adjust vertical forces to apportion weight. As shown in FIG. 1 one way of making this adjustment is by employing a horizontal pivoting hinge. The rod end of the aforementioned hydraulic cylinder when extended pushes on one leg of the horizontal hinge which is connected to the rear portion of the booster. The piston or barrel end of the cylinder is attached to the front portion or fixed leg of the horizontal hinge and rotates the hinge thereby rotating the rear frame of the booster away from the front end of the booster creating additional force to the ground. The reaction force applied to the trailer frame rails creates an upward moment as shown in FIG. 1.

What is claimed is:

1. A system comprising:
a multi-axle trailer with a front and a rear wherein the multi-axle trailer comprises at least one lift axle configured to be raised or lowered to distribute weight, to increase trailer deflection during a turn, or both;
a tractor;
a jeep mounted between the trailer and tractor wherein the jeep is configured to decrease weight on one or more axles;
a booster mounted to the rear of the multi-axle trailer;
wherein the system is configured such that during raising of the at least one lift axle an increase in air pressure to one or more other axles of the multi-axle trailer is employed to offset weight;
wherein the booster comprises a front section, a rear section, and hydraulic cylinders therebetween;
wherein the booster comprises a front section, a rear section, and hydraulic cylinders therebetween; wherein the hydraulic cylinders are configured to create a pivoting motion on the rear booster section to apply vertical forces on the front and rear sections relative to each other and apportion weight.

2. The system of claim 1 which further comprises one or more valves connected to one or more air tanks to increase the air pressure to the one or more other axles of the multi-axle trailer.

3. The system of claim 2 wherein the one or more valves are pneumatically powered.

4. The system of claim 2 wherein the one or more valves are hydraulic valves.

5. The system of claim 2 wherein the one or more valves are electric valves.

6. The system of claim 2 wherein the one or more valves are pneumatically powered, hydraulic, electric, or a combination thereof.

7. The system of claim 1 wherein the booster mounted to the rear of the multi-axle trailer is configured to be lifted and avoid contact with the ground via pneumatic power, hydraulic power, electric power, or a combination thereof.

8. The system of claim 7 wherein the multi-axle trailer is configured such that any one or more axles of the multi-axle trailer may be lifted from the ground.

9. The system of claim 1 further comprising independently controlled axles.

10. The system of claim 1 which further comprises a horizontal pivoting hinge in mechanical connection with at least one of the hydraulic cylinders such that when the at least one of the hydraulic cylinders is extended, the horizontal pivoting hinge pushes on the rear portion of the booster to create additional downward force on the rear booster section.

* * * * *